(12) United States Patent
Vaniglia

(10) Patent No.: US 7,849,903 B2
(45) Date of Patent: Dec. 14, 2010

(54) MOTORIZED CUT AND FEED HEAD

(75) Inventor: Milo M. Vaniglia, Cold Spring, KY (US)

(73) Assignee: Cincinnati Machine, LLC, Hebron, KY (US)

( * ) Notice: Subject to any disclaimer, the term of this patent is extended or adjusted under 35 U.S.C. 154(b) by 763 days.

(21) Appl. No.: 11/758,727

(22) Filed: Jun. 6, 2007

(65) Prior Publication Data

US 2008/0302483 A1    Dec. 11, 2008

(51) Int. Cl.
*B32B 38/04*    (2006.01)
*B32B 38/00*    (2006.01)

(52) U.S. Cl. .................. 156/517; 156/510; 156/511; 156/516; 156/252; 156/256

(58) Field of Classification Search .............. 156/156, 156/256, 257, 264, 265, 269, 270, 367, 468, 156/486, 510, 516, 517, 523, 527, 530, 538–541, 156/543, 544; 30/339
See application file for complete search history.

(56) References Cited

U.S. PATENT DOCUMENTS

| | | | |
|---|---|---|---|
| 3,775,219 A * | 11/1973 | Karlson et al. ............. | 156/363 |
| 4,292,108 A | 9/1981 | Weiss et al. | |
| 4,508,584 A * | 4/1985 | Charles .................... | 156/353 |
| 4,557,790 A | 12/1985 | Wisbey | |
| 4,569,716 A | 2/1986 | Pugh | |
| 4,637,286 A | 1/1987 | Boggs | |
| 4,699,683 A | 10/1987 | McCowin | |
| 4,750,965 A | 6/1988 | Pippel et al. | |
| 4,806,298 A | 2/1989 | Wilkinson et al. | |

(Continued)

FOREIGN PATENT DOCUMENTS

EP    0493739 A1    7/1992

(Continued)

OTHER PUBLICATIONS

Luis Izco, Javier Isturiz and Manu Motilva, High Speed Tow Placement System for Complex Surfaces with Cut/Clamp/ & Restart Capabilities 15 85 m/min (3350IPM), SAE International, 2006, 2006-01-3138.

(Continued)

*Primary Examiner*—Mark A Osele
*Assistant Examiner*—Christopher C Caillouet
(74) *Attorney, Agent, or Firm*—Reising Ethington P.C.

(57) ABSTRACT

A motorized head for applying fiber composite material to an application surface includes a drive roll and a backup roll for feeding fiber composite material toward the application surface, a compaction roll for pressing fiber composite material onto the application surface, and a restart pinch roll assembly located between the drive roll and the compaction roll for driving fiber composite material received from the drive roll to the compaction roll. The drive roll nip between the drive roll and the backup roll forms a drive zone that grips and drives the composite material, a clamp zone that prevents movement of the composite material after it has been cut, and a free zone that allows composite material to be freely pulled through the head. Two cutters mounted on the drive roll mesh with a single anvil on the backup roll to cut the composite material to the desired length.

22 Claims, 10 Drawing Sheets

U.S. PATENT DOCUMENTS

| | | |
|---|---|---|
| 4,867,834 A | 9/1989 | Alenskis et al. |
| 4,872,619 A | 10/1989 | Vaniglia |
| 4,877,193 A | 10/1989 | Vaniglia |
| 4,877,471 A | 10/1989 | McCowin et al. |
| 4,907,754 A | 3/1990 | Vaniglia |
| 5,015,326 A | 5/1991 | Frank |
| 5,022,952 A | 6/1991 | Vaniglia |
| 5,032,211 A | 7/1991 | Shinno et al. |
| 5,045,147 A | 9/1991 | Benson et al. |
| 5,058,497 A | 10/1991 | Bishop et al. |
| 5,110,395 A | 5/1992 | Vaniglia |
| 5,200,018 A | 4/1993 | Gill et al. |
| 5,290,389 A | 3/1994 | Shupe et al. |
| 5,454,897 A | 10/1995 | Vaniglia |
| 5,538,588 A | 7/1996 | Martinez |
| 5,645,677 A | 7/1997 | Cahuzac et al. |
| 5,775,565 A | 7/1998 | Sand |
| 5,779,793 A | 7/1998 | Sand |
| 5,873,291 A | 2/1999 | Sand |
| 5,979,531 A | 11/1999 | Barr et al. |
| 6,096,164 A | 8/2000 | Benson et al. |
| 6,299,810 B1 | 10/2001 | Blackinton, Jr. |
| 6,390,169 B1 | 5/2002 | Johnson |
| 6,401,581 B1 | 6/2002 | Sand |
| 6,968,883 B2 | 11/2005 | Torres Martinez |
| 7,036,413 B2 * | 5/2006 | Hartmann et al. ............. 83/154 |
| 2003/0052212 A1 | 3/2003 | Anderson et al. |
| 2005/0061422 A1 * | 3/2005 | Martin ....................... 156/230 |
| 2005/0067107 A1 | 3/2005 | Hitotsuyanagi et al. |
| 2007/0234907 A1 * | 10/2007 | Torres Martinez ............. 100/6 |

FOREIGN PATENT DOCUMENTS

| | | |
|---|---|---|
| EP | 1342555 | 9/2003 |
| ES | 2246713 | 7/2004 |
| WO | WO 99/22932 | 5/1999 |
| WO | WO2005/105415 A2 | 11/2005 |
| WO | WO 2006021601 | 3/2006 |

OTHER PUBLICATIONS

PCT/US2008/065862 International Search Report and Written Opinion, mailed Dec. 24, 2008, 7 pages.

* cited by examiner

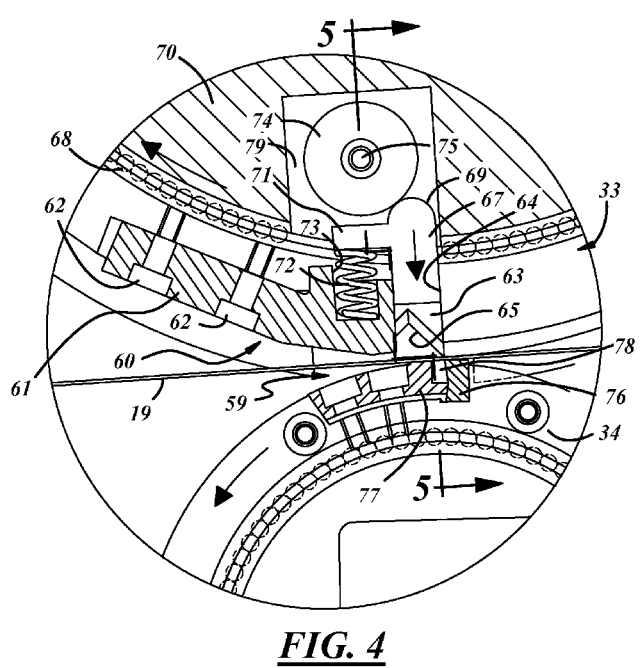
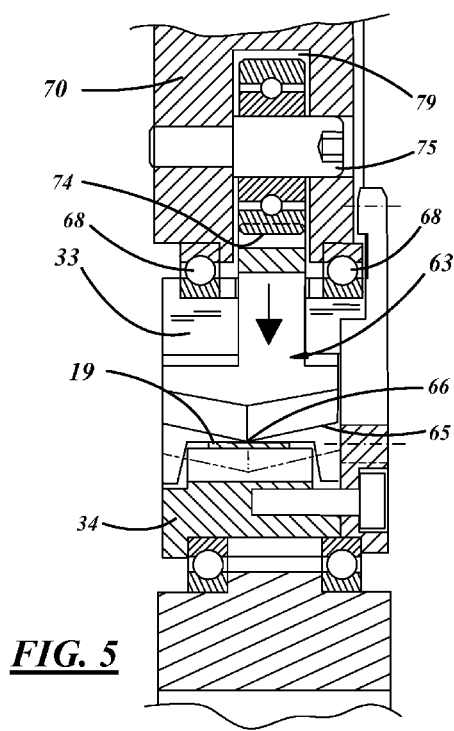
*FIG. 4*
*FIG. 5*

MOTORIZED CUT AND FEED HEAD

SUMMARY OF THE INVENTION

The invention relates to a head for applying fiber composite material to an application surface in which the individual lanes of fiber composite material are each driven by a drive roll that carries a clamp mechanism, a feed mechanism and a cutter for the composite material.

BACKGROUND OF THE INVENTION

Composite lay-up machines are well known in the art. Such machines can be divided into two basic types, fiber placement machines that lay bundles of individual fibers onto a surface, and tape laying machines that apply fiber composite material in the form of a wide tape onto a surface. If the surface that receives the fiber composite material is fairly continuous, and does not have a lot of contour, a tape laying machine can be used. If the surface is highly contoured or discontinuous because of the presence of openings in the surface, a fiber placement machine is used.

In the design of a fiber placement machine head it has been found that desirable results are achieved by feeding individual fiber bundles to a compaction roll along two main paths that are arranged in a "V". The odd numbered lanes of fibers approach the compaction roll along one leg of the V, and the even numbered lanes of fibers approach the compaction roll along the other leg of the V. In order for the head to be able to lay fiber in a concave area of the application surface, the V needs to be pointed instead of blunt, so that it can reach into the concave region. In order to maintain control over the motion of the fiber through the head, the leading end of the fiber has to be in contact with the application surface before the fiber can be cut. This means that the minimum length of fiber that can be laid on the application surface is equal to the length of the fiber path measured between the cutter and the compaction roll. This relationship requires the cutter for the fiber to be as close as possible to the compaction roll in order for the head to be able to lay short lengths of fiber. Lastly, if the head is to achieve high fiber application rates, the speed of the fiber through the head has to be maintained high during a fiber laying operation.

SUMMARY OF THE INVENTION

A fiber placement head for a fiber placement machine is able to cut and restart the fiber bundles of tow material at higher rates and provides improved accessibility for servicing and cleaning. The head utilizes an individual roller sets comprising a drive roll and backup roll for each tow lane in which each drive roll has the tow cutting and restarting mechanism carried on the roll's circumference. The roller sets are synchronized to match the dispensing speed of the tow material by means of a servo motor geared to each individual lane roller set. Each drive roll is geared to and meshes with a back-up roll that is half the diameter of the drive roll and that captures the tow material in a drive roll nip that is formed therebetween. The drive roll carries two cutters and two restarting zones, each of which are 180 degrees apart and that mesh with one anvil and restart zone on the back-up roll. A clearance zone is formed on the circumference of the drive roll and is positioned to permit free pulling of the tow material through the drive roll nip during non-cutting or restarting times such as when the compaction roll is traveling on the application surface to laminate the tow material. The fiber placement head also has the ability to dispense short pieces of tow material while maintaining sufficient clearance between the head and the application surface in those regions of the surface that may be concave or may present other protruding obstacles. This is accomplished by means of an auxiliary pinch and restart roller set located between the drive roll and the compaction roll that can hand-off the end of a tow from the drive roll to the compaction roll. The drive and back-up rolls and the pinch roll sets are mounted on inside and outside frame members that may be swung apart to open the fiber path, allowing the path to be cleaned or serviced. A locking mechanism is used to prevent relative rotation between the drive rolls and backup rolls when the frame members are swung open so that the correct relative positions of the rolls may be re-established when the frame members are closed.

BRIEF DESCRIPTION OF THE DRAWINGS

FIG. 4 is an enlarged view of the portion 4 of FIG. 3 showing in detail the cutter mechanism and the anvil.

FIG. 5 is a sectional view taken along line 5-5 of FIG. 4.

DESCRIPTION OF THE PREFERRED EMBODIMENT

Figure 1:
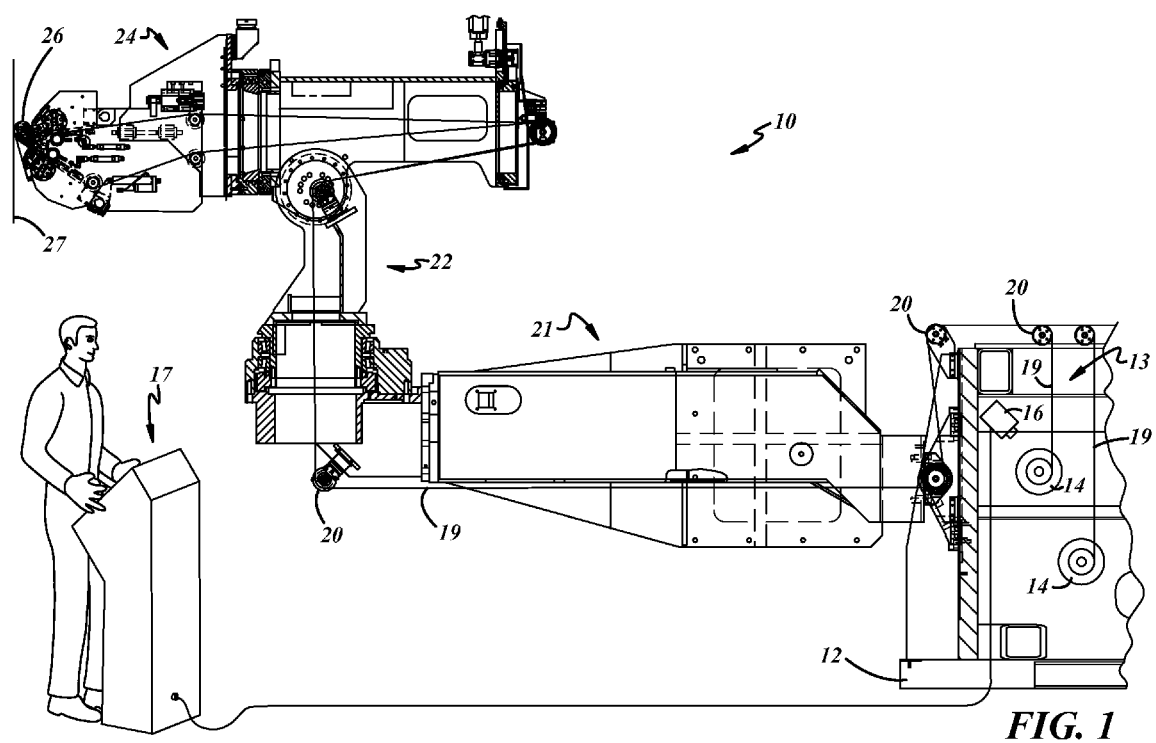
FIG. 1 is an overall view of a fiber composite application machine.

Turning now to FIG. 1, a fiber composite machine is generally designated by the reference numeral 10. The machine comprises a cross slide 12 that is supported on a carriage mounted on floor rails (not shown) that supports a creel 13 as well known in the art. The creel 13 holds a number of spools 14 of fiber composite material such as carbon fiber in a resin matrix. One or more cameras 16 located in the creel 13 are trained on the spools 14 and provide an image of the spools to an operator at a control console 17 to allow the operator to determine if any of the spools 14 is about to run out of fiber, or if any of the spools are jammed and are not rotating. If two cameras 16 are used in the creel, the images from the two cameras may be presented simultaneously to the operator on a split screen.

Individual fiber bundles 19 from the spools in the creel are directed by series of rollers 20 along the length of an arm 21 to a wrist assembly 22. The wrist assembly 22 rotates around three axes to provide the desired motion to a fiber placement head 24 that is carried on the end of the wrist 22. The fiber placement head 24 carries a compaction roll 26 that applies fiber bundles to an application surface 27. The application surface 27 may be fixed as in the case of a large irregularly shaped surface such as an aircraft wing or control surface, or may be mounted on a rotating headstock and tailstock as in the case of an application surface having rotational symmetry such as a cylindrical workpiece.

Figure 2:
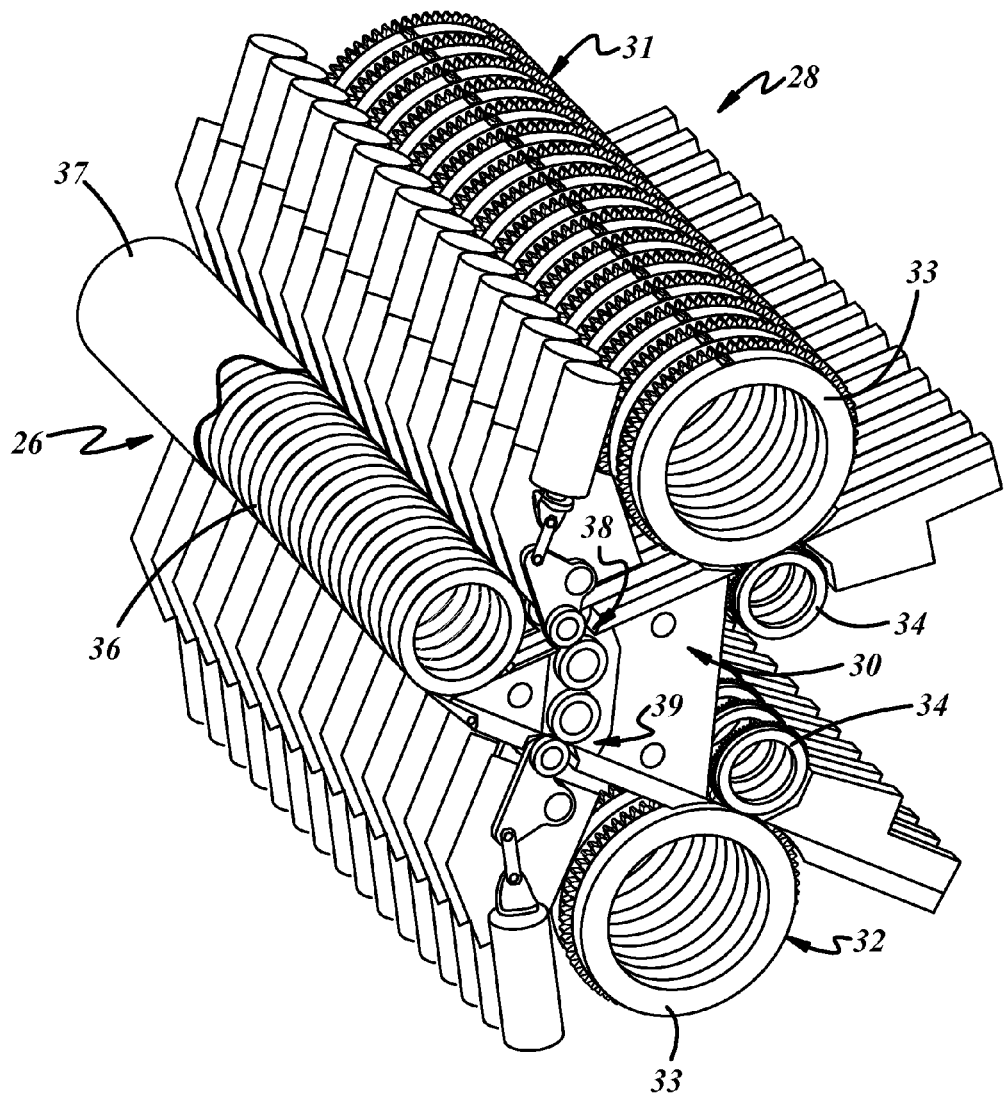
FIG. 2 is perspective view of a portion of the head of a fiber composite application machine showing the drive rolls, the restart rolls and the compaction roll.

FIG. 2 is a perspective view of the fiber delivery mechanism 28 in a fiber placement head. The mechanism 28 comprises a frame structure 30 which supports an upper array of drive roll assemblies 31 and lower array of drive roll assemblies 32. Each drive roll assembly comprises a drive roll 33 and a back-up roll 34 that is half the diameter of the drive roll 33. Each drive roll assembly 31 feeds fiber composite material along a fiber composite path or lane to the compaction roll 26 located at the front of the frame as well known in the art. The fiber composite materials in the upper and lower lanes are interleaved at the compaction roll 26 to form a continuous layer of side-by-side strips on the application surface. The compaction roll 26 is formed by a series of side by side roller segments 36 so that the outer surface of the compaction roll may adapt to the contour of the surface to which the composite material is being applied. A bladder 29 inside of the compaction roll segments (best seen in FIGS. 6-9) biases the segments 36 toward the application surface. The side-by-side segments 36 of the compaction roll 26 may be encased in a single flexible roller cover 37 or a segmented cover as described in U.S. Pat. No. 5,454,897. The frame 30 also supports an upper array of restart pinch roll assemblies 38 and a lower array of restart pinch roll assemblies 39 that are positioned between the drive roll assemblies 31 and 32, respectively, and the compaction roll 26, and as described more fully below.

Figure 3:
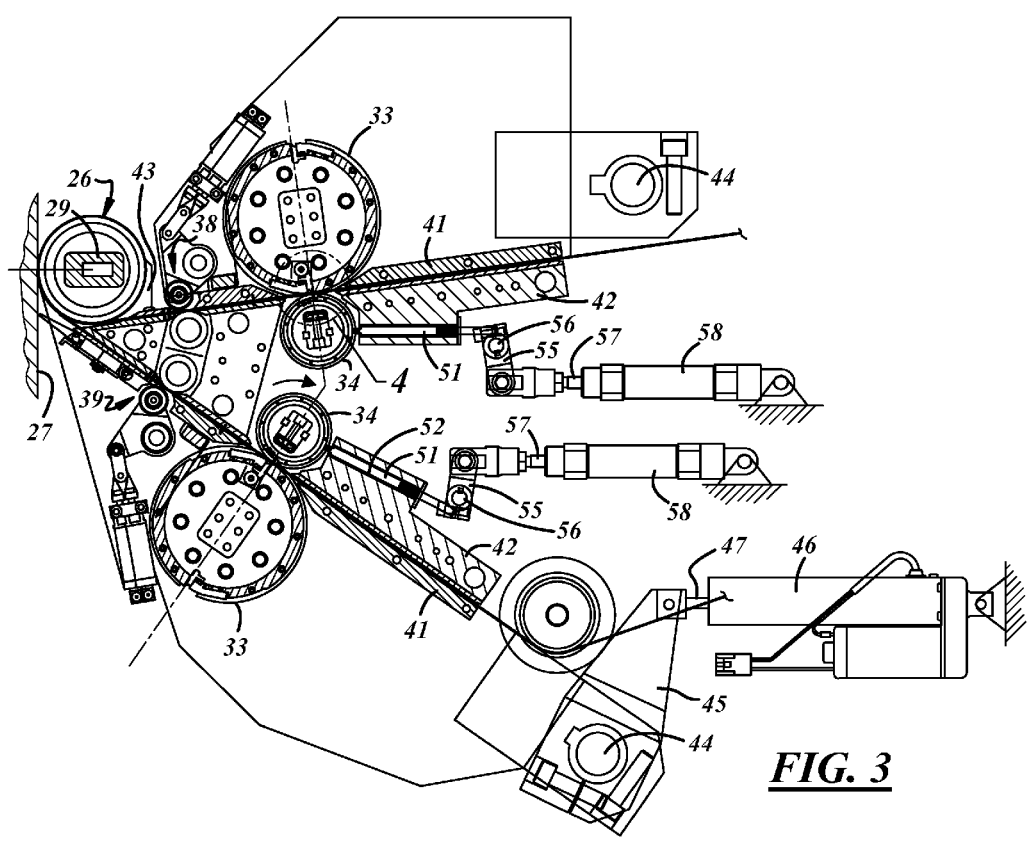
FIG. 3 is side sectional view of the head of a fiber composite application machine.

FIG. 3 is a side sectional view of the fiber delivery mechanism 28. Each drive roll 33 is mounted on an outside frame member 41 and is located opposite a backup roll 34 that is mounted on an inside frame member 42. The two inside frame members 42 form a "V" shaped structure. The compaction roll 26 is mounted on a bracket 43 on the end of one of the outside frame members 41. The restart pinch roll assemblies 38 and 39 are positioned between the drive rolls 33 and the compaction roll 26.

Figure 10:
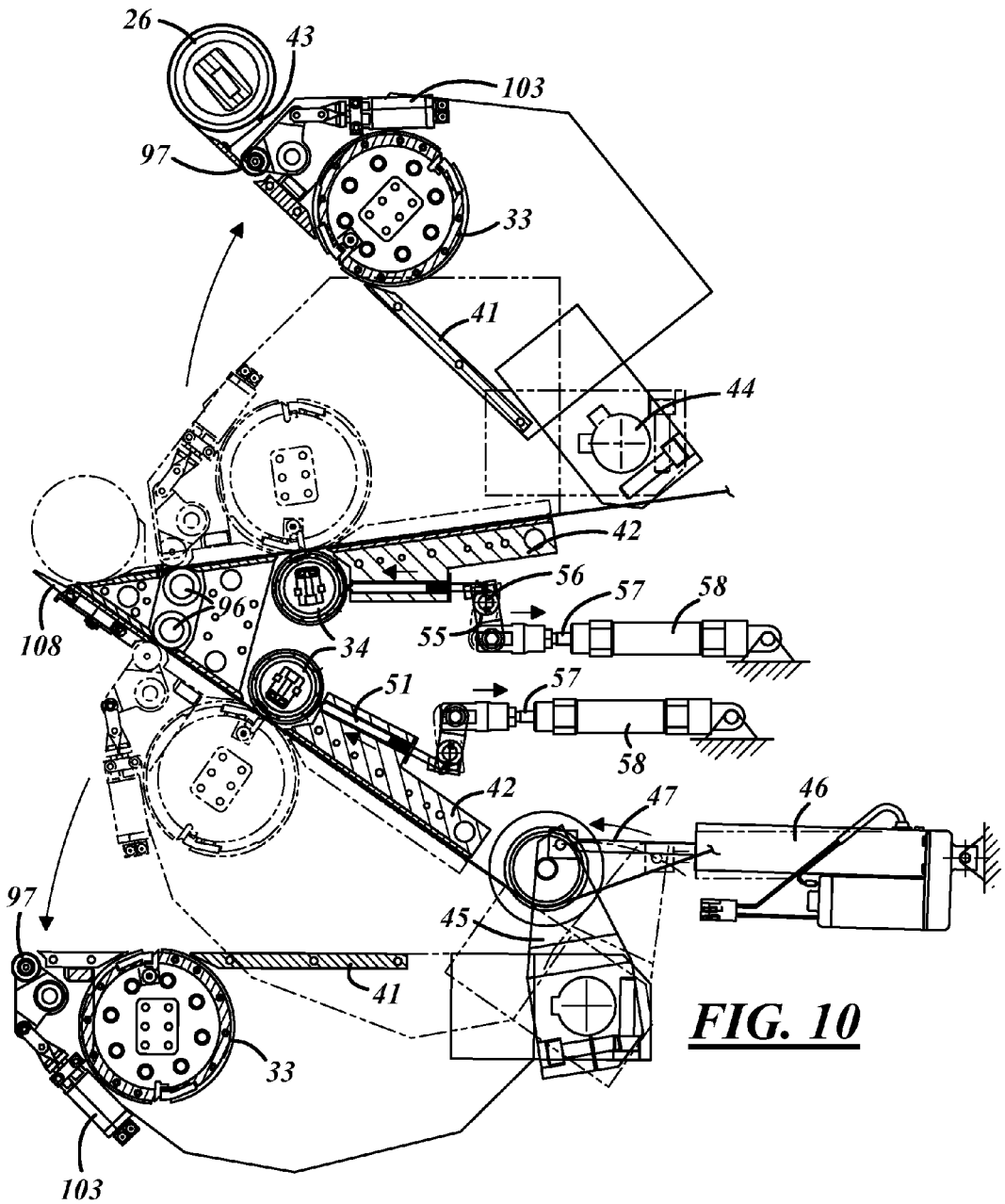
FIG. 10 shows movable portions of the frame in the open position for inspection and cleaning purposes.

A path or chute for the fiber composite material is formed between the outside frame member 41 and the inside frame member 42. Each outside frame member 41 is mounted on a frame member pivot 44 and a lever 45 is attached to the outside frame member 41. A frame member actuating cylinder 46 has a drive rod 47 that is attached to an end of the lever 45 and the actuating cylinder 46 may be used to rotate the outside frame member 41 about the pivot 44 to open up the fiber path for cleaning and inspection purposes as shown in FIG. 10. Although only one frame member actuating cylinder 46 is shown, two such cylinders are provided in the head, one for each outside frame member 41.

A locking pin 51 is slidably positioned in an elongated bore 52 in the inside frame member 42. One end of the locking pin 51 is positioned adjacent the outer periphery of the backup roll 34. The other end of the locking pin 51 is coupled to one end of a locking lever 55 that is mounted on a locking lever pivot post 56. The other end of the locking lever 55 is coupled to the actuating rod 57 of a pin actuating cylinder 58. When the rod 57 is retracted, as shown in FIGS. 3 and 10, the locking pin 51 is pushed into engagement with a detent notch 53 in the outer periphery of the backup roll 34, locking the backup roll against rotation. When the rod 57 is extended, as shown in FIGS. 6-9, the locking pin 51 is drawn out of engagement with the notch 53, allowing the backup roll 34 to be driven by its engagement with the drive roll 33.

FIG. 4 is an enlarged view of the elements of the cutter and the anvil shown in the circular section 4 of FIG. 3. A drive roll nip 59 is formed between the drive roll 33 and the backup roll 34. Fiber tow 19 from an upstream fiber path chute 54, best seen in FIGS. 6-9 and 11, passes through the drive roll nip 59. A cutter assembly 60 comprises a cutter retainer 61 that is attached to the drive roll 33 by suitable fasteners such as two screws 62 for rapid mounting and removal. A cutter blade 63 is mounted in a blade pocket 64 that is machined in the drive roll 33. The cutter blade 63 has a body portion 67 that is slidably mounted in the blade pocket 64, a cam follower portion 69 and a spring support finger 71 that is formed on the end of the body portion 67. A compression spring 72 is located in a spring pocket 73 formed on the underside of the cutter retainer 61, and the end of the spring 72 presses against the support finger 71. The drive roll 33 is mounted by bearings 68 on a non-rotating drive roll hub 70 that is secured to the outside frame member 41. A cam wheel 74 is mounted on a pivot that is mounted in a cam wheel pocket 79 on the drive roll hub 70. The cam wheel 74 is in a position to impact on the cam follower 69 as the cutter assembly 60 rotates past the cam wheel. This displaces the cutter blade 63 in the blade pocket 64 against the force of the compression spring 72, extending the blade 63 beyond the outer circumference of the drive roll 33. As the blade 63 extends the blade cuts through the composite material 19 in the drive roll nip 59, and shears against the edge of an anvil 76 that is mounted on the back-up roll 34 by an anvil retainer 77. As described below, the synchronized rotation of the drive roll 33 and the backup roll 34 ensures that the anvil 76 is always opposite the cutter 63 when the cutter extends beyond the surface of the drive roll 33.

Although the element 76 is called an anvil, it does not function as an anvil in the sense that the cutting element on the drive wheel 33 does not cut the fiber tow by pressing the fiber tow against the anvil surface. A recess 78 is formed between the anvil 76 and the anvil holder 77, and the sharp edge of the cutter blade 63 extends into the recess as it shears the fiber tow against the edge of the anvil 76.

FIG. 5 is a sectional view taken along lines 5-5 of FIG. 4. The cutter blade 63 that is mounted in the drive roll 33 has a cutting edge 65 in the shape of an arrowhead. The point 66 of the cutting edge 65 is in the center of the blade 63 so that the blade pierces the center of the composite material 19 that is positioned in the drive roll nip 59 and cuts the composite material from the center of the material out toward the sides. The cutting edge 65 of the cuter blade 63 is shown in the retracted position by solid lines, just above the fiber composite material 19. The cutter edge 65 is shown in the extended position by phantom lines, after having cut through the fiber composite material 19.

Figure 6:
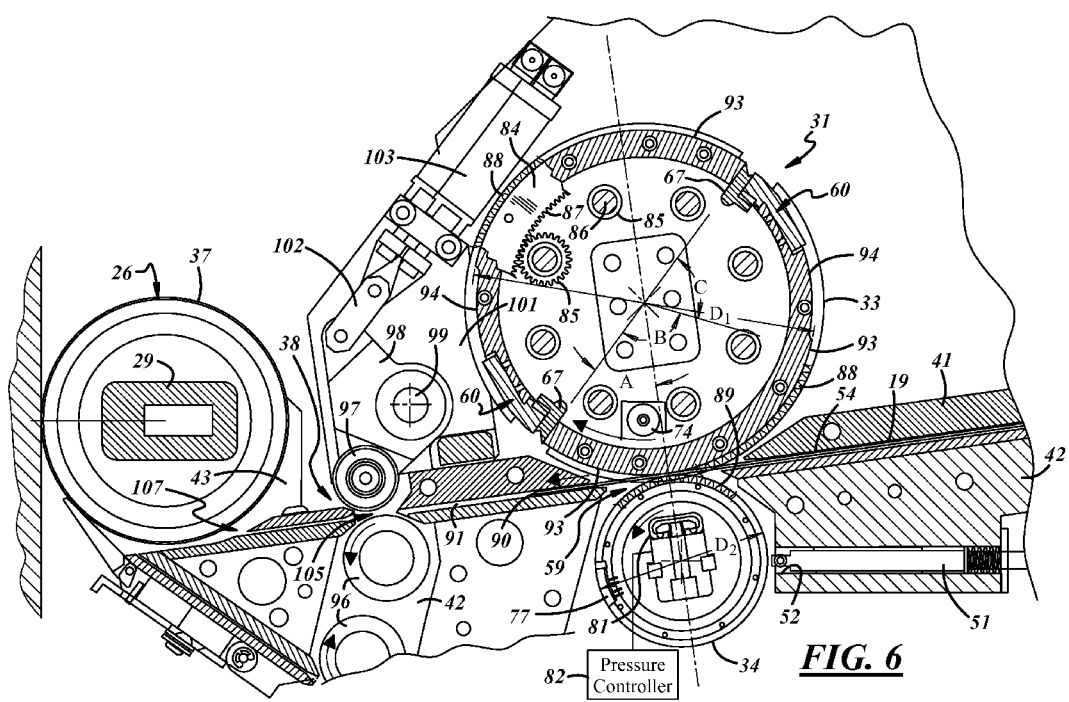
FIG. 6 shows the drive roll in the clamp position after the cutter has severed the composite material.

Turning now to FIG. 6, the space between the drive rolls 33 and the backup rolls 34 forms a drive roll nip 59. The thickness of the drive roll nip 59 varies in accordance with the rotational position of the drive rolls 33 and the pressure applied to a bladder 81 that biases the backup rolls 34 toward the drive rolls. The bladder 81 allows the position of the backup rolls to adjust relative to the drive rolls according to the thickness of the fiber composite material 19 that is passing through the drive roll nip 59. In the event that two lengths of fiber composite material are spliced together, the splice increases the thickness of the material, and the positions of the backup rolls are able to adjust accordingly. A pressure regulator 82 is coupled to the interior bladder 81 to regulate the pressure in the bladder.

FIG. 6 shows the drive roll 33 rotated to the clamp position after the cutter 63 has severed the composite material 19. The drive roll 33 does not rotate when it is in the clamp position, and the stationary position of the drive roll clamps the fiber composite material against the backup roll 34. The clamp position is reached by rotating the drive roll 33 through a preselected angle A after the cutter has severed the fiber. The drive roll 33 may be driven by a drive pinion 85 on the end of a drive shaft 86 that engages the internal gear teeth 87 of a ring gear 84 that is attached to the drive roll 33. A separate drive motor and drive shaft (not shown) is provided for each of the sixteen drive rolls 33 that are mounted on the upper outside frame member 41. Rotation of the drive roll 33 is transferred to the backup roll 34 by a separable drive transfer arrangement that drivingly couples the drive roll and the backup roll together. In the embodiment shown, external gear teeth 88 on the ring gear 84 engage gear teeth 89 on the outside of the backup roll 34, to positively couple the rotation of the drive roll to the backup roll.

FIG. 6 shows the severed end 90 of the fiber composite material 19 in the midstream fiber path chute 91 between the drive roll 33 and the restart roll assembly 38. In this position, the drive roll 33 is stationary and the meshing of the gear teeth 88 and 89 on the drive roll and the backup roll locks the backup roll 34 against rotation. Because the fiber composite material 19 is clamped in the drive roll nip 59, the fiber composite material is locked in place.

The outer surface of the drive roll 33 varies around its periphery. Two cutter assemblies 60 are mounted on each of drive rolls, and the cutter assemblies are 180° apart. Each cutter assembly 60 is followed by a drive zone surface 93 on a first portion of the drive roll that extends in the direction of rotation of the drive roll. The drive zone surface 93 is positioned relative to the backup roll 34 so that fiber composite material 19 that is positioned in the drive roll nip 59 is gripped and can be driven by the rolls 33 and 34. The drive zone surface may extend through an angle B that is between ninety and one hundred and thirty five degrees around the circumference of the drive roll, and in one embodiment, the drive zone surface extends for one hundred and thirteen degrees around the drive roll. A free zone surface 94 on a second portion of the drive roll follows the drive zone surface 93 in the direction of rotation of the drive roll 33. The free zone surface 94 is positioned relative to the backup roll 34 so that fiber composite material 19 that is positioned in the drive roll nip 59 cannot be gripped and cannot be driven by the rolls. When the free zone surface 94 is opposite the backup roll 34, fiber composite material 19 can be pulled freely through the drive roll nip 59 without contacting or dragging on the drive roll or the backup roll. This reduces the amount of resin from the fiber tow material that is transferred to the surface of the drive roll and the backup roll as the fiber tow is laid on the application surface. The free zone surface 94 may extend through an angle C between forty-five and ninety and degrees around the circumference of the drive roll, and in one embodiment, the free zone surface of the drive roll extends for sixty seven degrees around the drive roll. The diameter $D_1$ of the drive roll 33 is equal to twice the diameter $D_2$ of the backup roll 34.

The restart pinch roll assembly 38 is located between the drive roll assembly 31 and the compaction roll 26. A restart drive roll 96 is mounted on the inside frame member 42, and a restart backup or pinch roll 97 is mounted on the outside frame member 41. The restart drive roll 96 is coupled to a suitable driving device such as a friction drive shaft, belts or gears, not shown. A restart pinch roll 105 nip is formed between the restart drive roll 96 and the restart backup roll 97.

A shift mechanism comprises a shift plate 98 that is mounted by a shift plate pivot shaft 99 to a mounting bracket 101. The restart pinch roll 97 is mounted on the shift plate 98. One corner of the shift plate 98 is coupled by a link 102 to a restart actuator cylinder 103. The restart actuator cylinder 103 may be extended to narrow the restart pinch roll nip 105 between the restart drive roll 96 and the restart pinch roll 97, and may be retracted to widen the restart pinch roll nip 105. When the restart pinch roll nip 105 is narrowed, the fiber tow is gripped and can be driven by the restart pinch roll assembly. When the restart pinch roll nip 105 is widened, the fiber tow 19 passes freely through the nip, and cannot be driven by the restart roll assembly.

Figure 7:
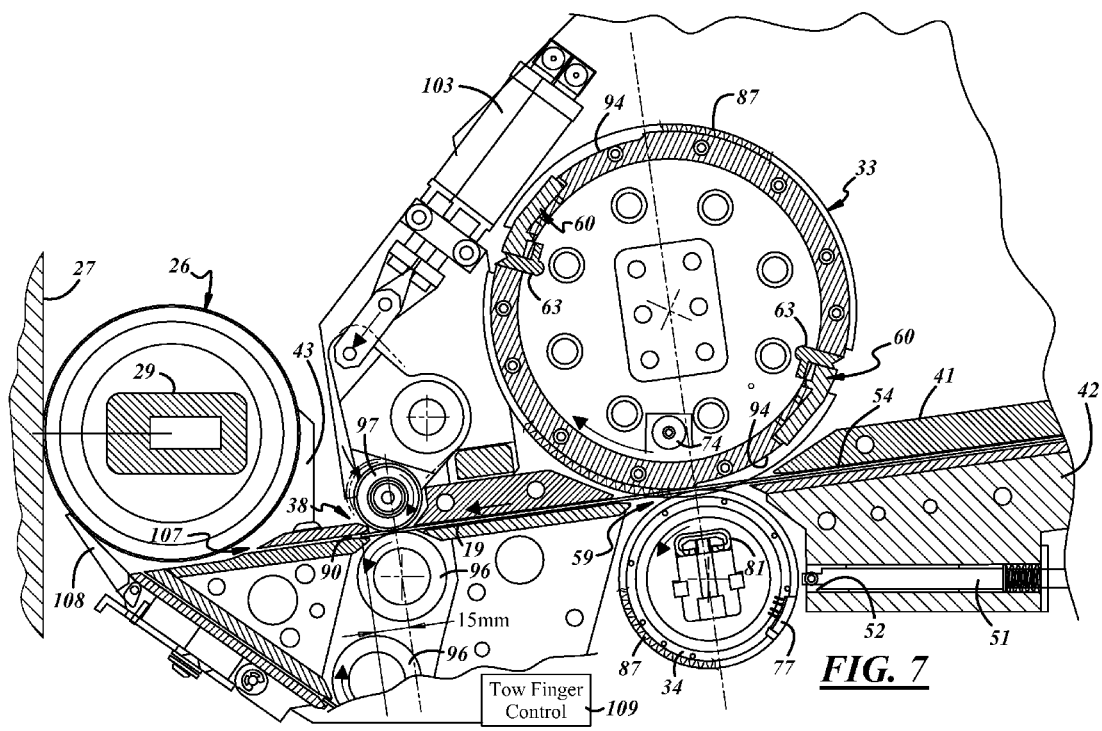
FIG. 7 shows the drive roll driving the composite material past the restart roll assembly.

FIG. 7 shows the end 90 of the composite material 19 driven past the restart pinch roll assembly 38. The restart actuator cylinder 103 is extended to shift the restart pinch roll 97 into engagement with the fiber tow 19, causing the restart pinch roll assembly 38 to drive the fiber composite material into the downstream fiber path or chute 107 that is between the restart roll pinch assembly 38 and the compaction roll 26. With the end of the fiber composite material in this position, the end of tow finger 108 is shown closely adjacent to the compaction roll 26 to deflect and guide the fiber composite material into contact with the compaction roll 26 and the application surface 27. Since the restart pinch roll assembly 38 is driving the fiber composite material, the free zone surface 94 of the drive roll 33 is entering the drive roll nip 59, allowing the composite material 19 to pass freely through the drive roll nip.

Figure 8:
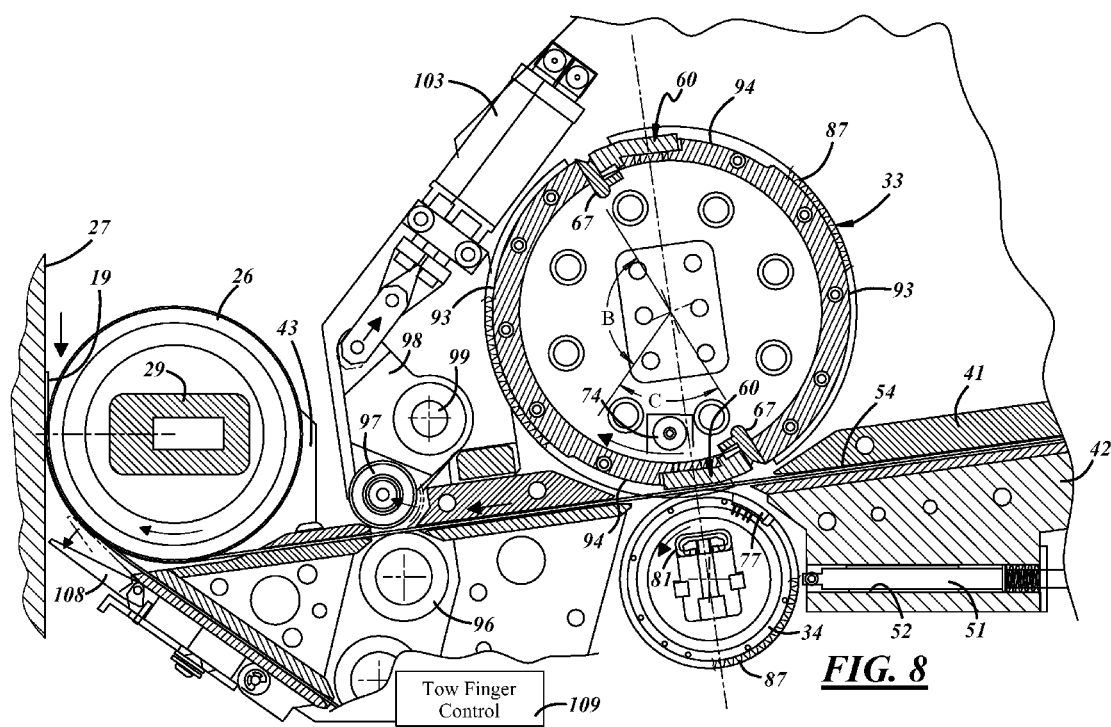
FIG. 8 shows the compaction roll applying composite material to the application surface with the drive roll in the free zone position and the restart rolls disengaged.
Figure 9:
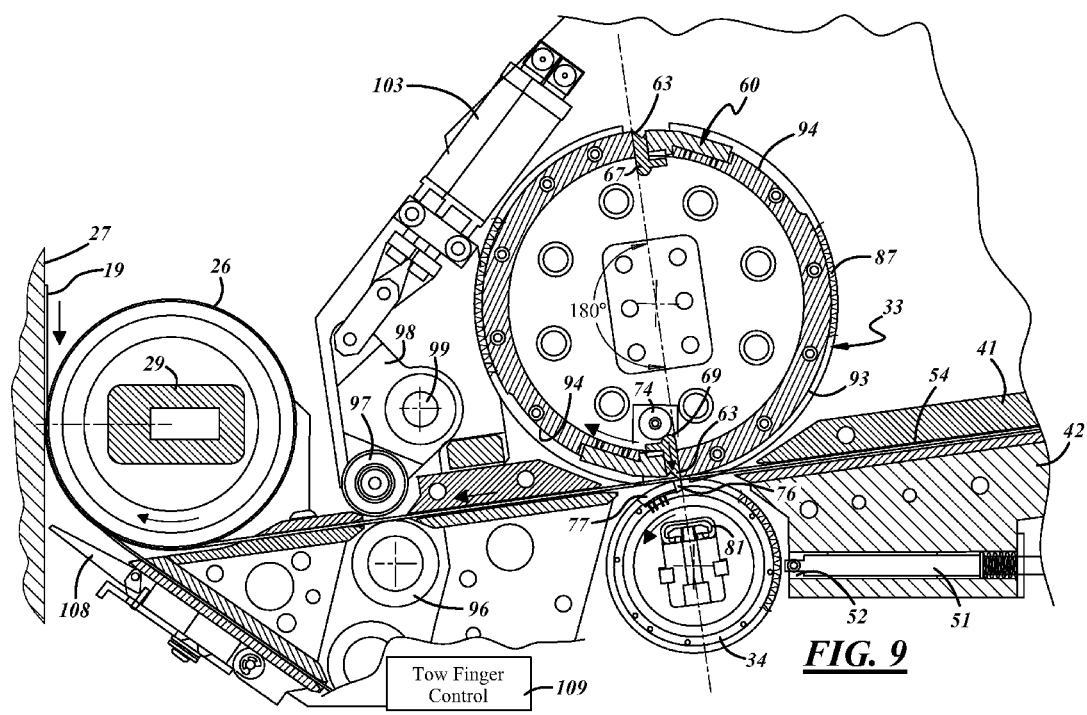
FIG. 9 shows the cutter on the drive roll cutting the composite material.

The tow finger 108 is deployed to divert the fiber 19 into the nip area of the compaction roll. A tow finger control 109 is provided to position each of the tow fingers 108 in either a first position that is adjacent the compaction roll 26 as shown in FIGS. 6 and 7, or a second position, spaced from the compaction roll as shown in FIGS. 8 and 9. The tow finger will deflect the tow 19 into contact with the compaction roll 26 when the associated restart roll 38 engages the fiber composite material 19. In one mode of operation, simultaneous movement of all of the tow fingers 108 to press the tow against the compaction roll 26 will occur when the restart rolls 38 are in position to drive the fiber tow 19. The tow fingers 108 may be deployed individually when desired.

FIG. 8 shows the compaction roll 26 applying composite material to the application surface 27. During this step of the composite material application process, the tow finger 108 is retracted to the second position spaced from the compaction roll 26, the restart pinch roll 97 is retracted from contact with the composite material 19, and the drive roll 33 is in the free zone position. The compaction roll 26 "paints" the composite material 19 onto the application surface 27, and none of the drive or backup rolls of the application head contact the composite material, minimizing the amount of composite material resin that is transferred to the structure of the application head, and increasing amount of composite material that can be applied to the application surface without the need to clean the head. The drive roll 33 remains in the free zone position until it is necessary to use the cutter 63 on the drive roll to cut the composite fiber 19 because the application head has reached the end of a course.

FIG. 9 shows the drive roll 33 rotated to a position in which the cutter 63 cuts the composite material 19. The cam wheel 74 impacts on the cam follower 69 to drive the cutting blade 63 into the anvil 76, severing the composite material 19. After the composite material 19 is cut, the application head continues to apply composite material to the application surface 27 until all of the composite material between the compaction roll and the cutter blade has been "painted" onto the application surface.

The inclusion of the pinch roll assembly 38 in the fiber application head substantially reduces the shortest length of tow material that can be laid on the application surface 27. Ordinarily, the shortest length of tow material 19 that can be laid onto the application surface 27 is equal to the distance measured from the drive roll nip to the point of contact between the compaction roll 26 and the application surface. This is due to the fact that once the tow material has been cut by the drive roll cutter 63, if the tow material is not in the nip between the application roll 26 and the application surface 27, there is nothing to pull or feed the tow material through the application head. The pinch roll assembly 38 changes this relationship by being able to drive the tow 19 material to the application surface after the tow material has been cut by the drive roll cutter 63. As a result, the shortest length of to material that can be laid by the application head is equal to the longer of the distance measured between drive roll nip 59 and the pinch roll nip 105, and the distance measured between the pinch roll nip and the compaction roll nip.

FIG. 10 shows the outside frame portions 41 pivoted to the open position for inspection and cleaning purposes. This pivoting separates the drive roll 33 from the backup roll 34, and the restart pinch rolls 97 from the restart drive rolls 96. The pivoting also separates the compaction roll 26 from the inside frame member 42, and opens the fiber composite path including the upstream, midstream, and downstream fiber path chutes 54, 91 and 107, respectively. Before the outside frame portions 41 are pivoted to the open position, the actuating cylinders 58 are retracted causing the locking pins 51 to engage the detent notches 53 of the backup rolls 34, locking the backup rolls against rotation. This ensures that the correct relative rotational positions of the drive rolls 33 and the backup rolls 34 are maintained while the outside frame members 41 are in the open position. This is necessary to ensure that the anvil 76 is rotated to the drive roll nip 59 at the same time that the cutter blade 63 rotates to the drive roll nip during subsequent operation of the fiber placement head.

Figure 11:
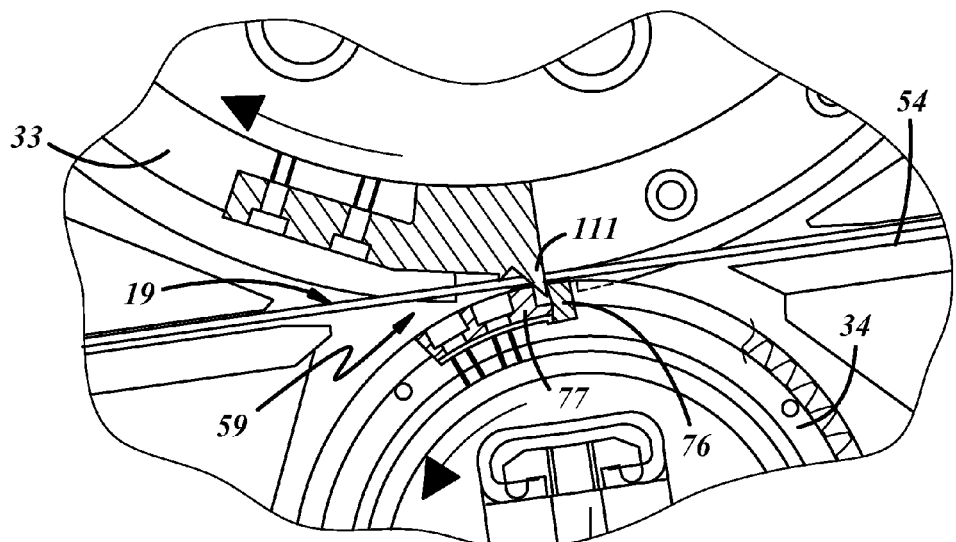
FIG. 11 shows a fixed cutter blade on the drive roll severing the fiber composite material.

FIG. 11 shows an alternate embodiment in which a fixed cutter blade 111 is mounted on the drive roll 33. For some applications, it may not be necessary to plunge the cutter blade 111 into the composite material in order to sever the composite material. For these applications, a fixed cutter blade 111 is used. The synchronized rotation of the drive roll 33 and the backup roll 34 is still required to ensure that the cutter blade 111 always impacts the backup roll in the region of the anvil 76 so that the composite material 19 will be properly cut and to avoid damage to the cutter blade.

Figure 12:
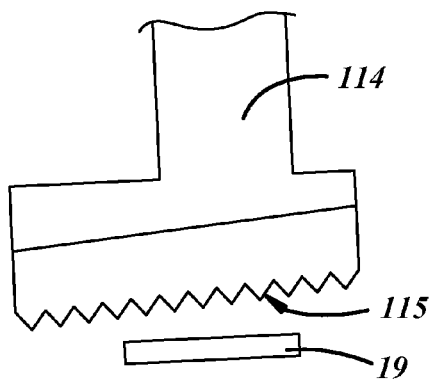
FIG. 12 shows a serrated blade design for the cutter blade on the drive roll.
Figure 13:
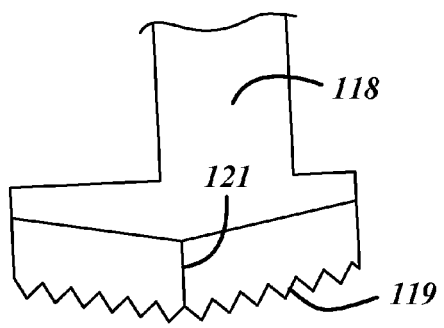
FIG. 13 shows an alternative serrated blade design for the cutter blade on the drive roll.

FIGS. 12 and 13 show alternate designs for the cutting blade used to cut the fiber composite material 19. In FIG. 12, the cutting blade 114 has a serrated edge 115 that is formed at an angle to the plane of the fiber tow material 19 that will be cut by the blade. In FIG. 13, the cutting blade 118 has a serrated edge 119 that is formed in an arrowhead shape so that the arrowhead shape slopes toward the center 121 of the serrated edge.

Having thus described the invention, various modifications and alterations will be apparent to those skilled in the art, which modifications and alterations will be within the scope of the invention as defined by the appended claims.

The invention claimed is:

1. A head for applying fiber composite material to an application surface, the head comprising:
at least one drive roll assembly for feeding fiber composite material toward the application surface;
a drive roll and a backup roll comprising the drive roll assembly;
at least one cutter comprising a cutter blade mounted on the drive roll;
a compaction roll for pressing fiber composite material received from the drive roll onto the application surface; and,
a restart pinch roll assembly located between the drive roll assembly and the compaction roll, the restart pinch roll assembly having a restart pinch roll nip for driving fiber composite material received from the drive roll assembly to the compaction roll.

2. The head of claim 1 further comprising:
a drive roll nip formed between the drive roll and the backup roll;
a clamp zone formed in the beginning of the drive zone;
a drive zone surface formed on a first portion of the drive roll surface; and,
a free zone surface formed on a second portion of the drive roll surface, the drive roll surface being spaced from the backup roll so that the composite material can be gripped and driven by the drive roll surface when the drive roll surface is opposite the backup roll, and the free zone surface being spaced from the backup roll so that the composite material may slide freely between the drive roll and the backup roll when the free zone surface is opposite the backup roll.

3. The head of claim 2 further comprising:
a drive transfer arrangement between the drive roll and the backup roll, whereby rotation of the drive roll is synchronized with the rotation of the backup roll.

4. The head of claim 3 further comprising:
an anvil mounted on the backup roll; whereby the drive transfer arrangement between the drive roll and the backup roll synchronizes the rotation of the drive roll and the backup roll so that the at least one cutter on the drive roll impacts the anvil on the backup roll when the cutter on the drive roll is opposite the backup roll.

5. The head of claim 4 wherein the drive roll has an outer diameter and the backup roll has an outer diameter, and wherein the outer diameter of the drive roll in the region of the drive roll surface is twice the outer diameter of the backup roll.

6. The head of claim 5 further comprising:
two cutters mounted on the drive roll, whereby the drive transfer arrangement between the drive roll and the backup roll causes each of the two cutters to impact the anvil on the backup roll at two rotational positions of the drive roll.

7. The head of claim 2 further comprising:
a biasing device for biasing one of the drive roll and the backup roll into the drive roll nip, the biasing device allowing the drive roll assembly to grip the composite material when the drive roll surface is in the drive roll nip, and the biasing device further allowing the drive roll and the backup roll to move away from one another in response composite material of increased thickness passing through the drive roll nip.

8. The head of claim 7 further comprising:
a pneumatic bladder in the backup roll comprising the biasing device.

9. The head of claim 8 further comprising a pressure controller coupled to the pneumatic bladder, whereby the pressure in the pneumatic bladder may be controlled.

10. The head of claim 1 further comprising:
a restart drive roll and a restart backup roll comprising the pinch roll assembly; and, a retraction mechanism for a portion of the restart pinch roll assembly, whereby the restart pinch roll nip may be varied between a first drive position in which the restart drive roll and the restart backup roll contact and grip the composite material, and a second retracted position in which the restart backup roll and the restart pinch roll have no contact with or grip on the composite material.

11. The head of claim 10 further comprising an actuator cylinder for altering the gap between the restart pinch roll and the restart backup roll.

12. The head of claim 2 further comprising:
a frame having a first fixed V-shaped portion and a second movable portion, a first portion of the drive roll assembly and a first portion of the pinch roll assembly being mounted on the first fixed portion of the frame, and a second portion of the drive roll assembly and a second portion of the pinch roll assembly being mounted on the second movable portion of the frame, whereby the movable portion of the frame may used to separate the first and second portions of the drive roll assembly and the pinch roll assembly from their normal operative positions for inspection and cleaning purposes.

13. The head of claim 12 further comprising:
a pivot attachment coupling the first portion of the frame to the second portion of the frame, wherein the backup roll of the drive roll assembly and the restart pinch roll of the pinch roll assembly are mounted to the first fixed portion of the frame, and the drive roll of the drive roll assembly and the restart pinch roll of the restart roll assembly are mounted to the second movable portion of the frame.

14. The head of claim 12 further comprising:
a composite material path formed between the drive roll and the backup roll and between the restart drive roll and the restart pinch roll, wherein the composite material path is formed between the first and second portions of the frame.

15. The head of claim 12 further comprising:
an engageable lock for preventing rotation of the backup roll relative to the drive roll when the first and second portions of the drive roll assembly are separated from their normal operative positions for inspection and cleaning purposes.

16. The head of claim 15 further comprising:
a locking pin and an actuating cylinder comprising the engageable lock, the actuating cylinder causing the locking pin to engage a detent on the backup roll to prevent rotation thereof when the first and second portions of the drive roll assembly and the pinch roll assembly are separated from their normal operative positions for inspection and cleaning purposes.

17. The head of claim 1 further comprising:
a movable mounting for the cutter blade, the movable mounting allowing the cutter blade to have a first position which is below the surface of the drive roll and a second position which is above the surface of the drive roll.

18. The head of claim 17 further comprising:
an extension mechanism for the cutter blade, the extension mechanism causing the cutter blade to rise above the surface of the drive roll in a rapid, striking motion.

19. The head of claim 18 further comprising:
a blade pocket formed on the drive wheel;
the movable blade having a body portion that is dimensioned to slidably fit in the blade pocket;
a cam follower formed on the body portion; and,
a cam mounted interiorly of the drive wheel, whereby rotation of the drive wheel causes the cam to impact the cam follower on the body portion extending the blade above the surface of the drive wheel, and wherein the cam and the cam follower comprise the extension mechanism for the cutter blade.

20. The head of claim 1 wherein the cutting edge of the blade is smooth.

21. The head of claim 1 wherein the cutting edge of the blade is serrated.

22. The head of claim 1 further comprising:
a tow finger having a base and a tip, the tip of the tow finger having a first position that is adjacent the surface of the compaction roll to deflect composite material into contact with the compaction roll, and
a tow finger retraction mechanism coupled to the base of the tow finger, whereby the tip of the tow finger may be retracted to a second position out of proximity to the compaction roll so that the tow finger does not contact composite material that is being laminated onto the application surface.

\* \* \* \* \*

UNITED STATES PATENT AND TRADEMARK OFFICE
CERTIFICATE OF CORRECTION

| | | |
|---|---|---|
| PATENT NO. | : 7,849,903 B2 | Page 1 of 1 |
| APPLICATION NO. | : 11/758727 | |
| DATED | : December 14, 2010 | |
| INVENTOR(S) | : Vaniglia | |

It is certified that error appears in the above-identified patent and that said Letters Patent is hereby corrected as shown below:

Col. 2, line 20: after FIG. 2 insert --an--

Col. 2, line 23: after FIG. 3 insert --an--

Col. 3, line 20: after "a series of" delete "side by side" and insert --side-by-side--

Col. 5, line 54: after "and ninety" delete "and"

Col. 7, line 18: after "length of" delete "to"

Col. 8, line 57: after "response" insert --to--

Col. 9, line 20: after "frame may" insert --be--

Signed and Sealed this
Tenth Day of May, 2011

David J. Kappos
*Director of the United States Patent and Trademark Office*